United States Patent [19]

Moore

[11] 3,839,305

[45] Oct. 1, 1974

[54] METHOD OF MAKING VINYLIDENE FLUORIDE COPOLYMERS

[75] Inventor: Albert Lloyd Moore, Wilmington, Del.

[73] Assignee: E. I. du Pont de Nemours and Company, Wilmington, Del.

[22] Filed: Nov. 10, 1971

[21] Appl. No.: 197,512

Related U.S. Application Data

[63] Continuation-in-part of Ser. No. 98,044, Dec. 14, 1970, abandoned.

[52] U.S. Cl.............. 260/80.77, 260/87.7, 260/95
[51] Int. Cl....................... C08f 15/40, C08f 15/06
[58] Field of Search............ 260/87.5 A, 87.7, 80.77

[56] References Cited
UNITED STATES PATENTS

| | | | |
|---|---|---|---|
| 3,069,401 | 10/1962 | Gallagher | 260/87.7 |
| 3,467,636 | 9/1969 | Nersasian | 260/80.77 |
| 3,472,829 | 10/1969 | Claybaugh | 260/93.7 |
| 3,547,857 | 12/1970 | Murray | 260/85.5 |
| 3,560,454 | 2/1971 | Buning | 260/78.4 |
| 3,634,369 | 1/1972 | Baumann | 260/80.77 |

FOREIGN PATENTS OR APPLICATIONS

| | | | |
|---|---|---|---|
| 621,540 | 6/1961 | Canada | 260/87.7 |
| 676,648 | 12/1963 | Canada | 260/87.7 |
| 767,754 | 9/1967 | Canada | 260/87.7 |

Primary Examiner—Joseph L. Schofer
Assistant Examiner—C. A. Henderson, Jr.

[57] ABSTRACT

Vinylidene fluoride copolymers having broad molecular weight distribution and desirable processing characteristics can be made in uniform quality at reasonable cost in a continuous process by (A) continuously feeding to a reactor the monomers, water and initiator needed for free-radical emulsion polymerization; (B) feeding a chain transfer agent to the reactor during a plurality of time cycles, each cycle being at least six times the average reactor residence time, at a rate that varies widely in each time cycle; (C) causing the resulting reaction mixture to polymerize and form a vinylidene fluoride copolymer latex continuously; and (D) passing the copolymer to a mixer which holds at least the amount of copolymer produced in one of the Step B time cycles and mixing it until its molecular weight distribution is uniform.

14 Claims, No Drawings

METHOD OF MAKING VINYLIDENE FLUORIDE COPOLYMERS

CROSS-REFERENCE TO RELATED APPLICATION

This is a continuation-in-part of U.S. Pat. application Ser. No. 98,044, filed on Dec. 14, 1970 now abandoned.

BACKGROUND OF THE INVENTION

This invention relates to a continuous process for preparing vinylidene fluoride copolymers having a broad molecular weight distribution. These copolymers contain polymer molecules which differ considerably from each other in molecular weight. Of particular interest are such copolymers made up of a mixture of molecules of relatively high molecular weight (e.g., having an inherent viscosity of about 1.5–3) and molecules of considerably lower molecular weight (e.g., having an inherent viscosity of about 0.2–0.8).

It is known that vinylidene fluoride copolymers such as vinylidene fluoride-hexafluoropropylene copolymer elastomers and vinylidene fluoride-hexafluoropropylenetetrafluoroethylene terpolymer elastomers have many important uses. The high molecular weight grades are especially useful in the manufacture of cured elastomer articles having good compression set properties (e.g., good volume recovery after deformation for a given period at a given high temperature). U.S. Pat. No. 3,051,677 to Rexford shows a typical prior art process and apparatus for preparing vinylidene fluoride copolymers.

Unfortunately, the processing characteristics of vinylidene fluoride copolymers as obtained by the prior art methods are not entirely satisfactory in a number of applications. For example, when the product has very high molecular weight and sufficient cohesive strength for good milling and acceptance of fillers, it tends to lack the flow properties generally needed for rapid and efficient extrusion and molding. A process is needed which enables one to prepare these copolymers in a manner which provides a product having improved processing characteristics including good flow properties combined with good cohesive strength. And what is especially needed is such a process that enables one to manufacture a product of substantially uniform quality on a continuous basis at reasonable cost.

SUMMARY OF THE INVENTION

Expressed broadly, the present invention provides a continuous process for the manufacture of a vinylidene fluoride copolymer having a broad molecular weight distribution that is substantially constant for a particular production run which comprises (A) continuously feeding to a polymerization reaction zone vinylidene fluoride, at least one other fluorinated ethylenically unsaturated monomer containing at least as many fluorine atoms as carbon atoms, water, and an inorganic free-radical initiator, in proportions suitable for the free-radical emulsion polymerization of the monomers, (B) during a plurality of substantially equal time cycles, feeding a chain transfer agent to said reaction zone at a rate that varies widely within a given time cycle according to a predetermined schedule of alternately using a very low rate of feed for one period and using a sharply increased rate of feed for the next period, each of said periods being at least three times the average residence time of the resulting reaction mixture in the reaction zone, (C) causing the resulting reaction mixture to undergo a free-radical emulsion polymerization reaction as it passes through the reaction zone whereby a latex of said copolymer is formed continuously, and (D) continuously removing the resulting copolymer from the reaction zone and mixing it, until its molecular weight distribution is substantially uniform, in a mixing zone holding at least the amount of copolymer produced in one of the Step B time cycles.

DESCRIPTION OF PREFERRED EMBODIMENTS

It is often preferred that the vinylidene fluoride and the other monomer component (composed of one or more other monomers as specified in Step A) have a weight ratio of about 30:70 to 70:30. Especially preferred as the other monomer component in such cases is hexafluoropropylene. The monomers are fed in a ratio that is the same or similar to the ratio of monomer units desired in the copolymer product. Another preferred mixture of monomers to use in Step A is composed of about 25–70 percent vinylidene fluoride, 19–60 percent hexafluoropropylene, and 3–35 percent tetrafluoroethylene based on the total weight of said monomers. This is illustrated below in Example 5.

Among the other monomers which can be used with vinylidene fluoride to manufacture useful copolymers by the present process are chlorotrifluoroethylene, dichlorodifluoroethylene, chlorofluoroethylene, trifluoropropene, hexafluorobutene, fluorinated vinyl esters, derivatives of perfluoro acrylic acid, fluorinated alkyl vinyl ethers (e.g., perfluoroalkyl perfluorovinyl ether) 1,2,3,3,3-pentafluoropropylene and the like.

The initiator used in Step A is preferably ammonium persulfate, sodium persulfate, potassium persulfate, or a mixture of two or more such compounds. Also useful are other water-soluble inorganic peroxide compounds, for example, sodium, potassium, and ammonium perphosphates, perborates, and percarbonates. The initiator can be used in combination with a reducing agent such as sodium, potassium or ammonium sulfite, bisulfite, metabisulfite, hyposulfite, thiosulfate, phosphite, or hypophosphite; or in combination with a ferrous, cuprous, or silver salt, or other easily oxidized metal compound.

One skilled in the art, after reading the present disclosure (and in some cases possibly after one or two simple trial runs), will have no difficulty in selecting the proportion of initiator and other materials fed to the reactor that gives the desired rate of polymerization and product properties for the reaction mixture and reaction conditions used in any particular application. During the period of the Step B time cycle when little or no transfer agent is being fed to the reactor, the initiator is fed relatively slowly at a rate such that a copolymer having the desired high molecular weight is formed. And during the period of relatively fast feed of transfer agent (and resultant formation of copolymer of considerably lower molecular weight), the rate of feeding initiator is preferably increased enough so that the rate of the Step C polymerization reaction does not vary an unreasonable amount within each time cycle.

It will be apparent, for example, that if one wishes to carry out the process of Example 1 below (using the same initiator to prepare the same polymer) but using a lower reactor temperature, or a shorter residence time, one can increase the amount of initiator until about the same results are obtained. It will also be apparent that if the solids content and viscosity of a given reaction mixture is high enough to make it difficult to control the temperature properly or to use a particular isolation method, one can increase the water content of the reaction mixture until suitable results are obtained. Usually, the water content of the reaction mixture will be about 70–85 percent by weight.

In Step B, it is usually preferred that the rate of feed of chain transfer agent for each of said periods (low rate period and increased rate period) be substantially the same (exactly or almost exactly the same) in each time cycle of the production run. Each time cycle is at least 6 times the average residence time of the mixture in the reaction zone. "Average residence time" herein means the value obtained by dividing the volume of the reactor by the volumetric flow rate of the material flowing from the reactor outlet. This value indicates quite closely the period of time the reaction mixture is actually in the reactor. A related term which is sometimes used for the sake of convenience as an approximate indication of residence time is "nominal residence time" (see Step 1 of Example 1 below). This value is obtained by dividing the volume of the reactor by the volumetric flow rate of water into the reactor.

It will be understood from the present disclosure that during 1 period (equal to at least 3 times the average residence time) of a given time cycle one feeds the transfer agent at a very low rate whereby polymer molecules of high molecular weight are produced. It is often preferred to use conditions during this low rate period that will result in the highest molecular weight polymer possible while maintaining a reasonably fast rate of production and a practical initiator content. During this low rate period, the rate at which the transfer agent is fed is preferably low enough so that the resulting polymer has an inherent viscosity of about 1.5–3. When using the preferred transfer agents, it is often best to use a feed rate of less than one part by weight of transfer agent per 1000 parts by weight of monomers fed during this period.

During the next period of said time cycle, one feeds the transfer agent at a sharply increased rate whereby polymer molecules of considerably lower molecular weight are produced. The feed rate is preferably high enough so that the polymer produced during this period has an inherent viscosity of about 0.2–0.8. When using the preferred transfer agents during this period, it is often best to use a feed rate of about 2–50 parts by weight of transfer agent per 1000 parts by weight of monomers fed during this period. Thus, during two different periods of each time cycle, the transfer agent is fed at a rate that varies widely enough so that the polymer produced in one period is considerably higher in molecular weight than the polymer produced in the other period. It is usually preferred that a value of 2 or more be obtained when the inherent viscosity of the high molecular weight component is divided by the inherent viscosity of the low molecular weight component (H/L value = 2 or more). The examples given below set forth some useful predetermined schedules for such an alternating feed rate system. If one wishes to practice the invention in a manner somewhat different from what is illustrated in the examples (e.g., to make another vinylidene fluoride copolymer, to use a different transfer agent, or to modify the molecular weight of the low molecular weight component), one skilled in the art will have no difficulty in establishing a suitable schedule for transfer agent feed during the 2 periods of each cycle so that the polymer components have the desired difference in molecular weight for a particular application.

The chain transfer agent is a material capable in any given polymerization system of the present invention of transferring the radical activity from a growing polymer molecule to a molecule of the transfer agent, whereby growth of another polymer molecule is initiated and the polymerization reaction continues. Chain transfer agents which can be used to obtain the desired nonionic end groups in the copolymer product include hydrocarbon alcohols, esters, halides, ketones and mercaptans containing one to 12 carbon atoms. Among the preferred transfer agents to employ in Step B are diethylmalonate, diethylsuccinate, ethylacetate, methylene bromide, carbontetrachloride, ethanol, n-propanol, and isopropanol, and blends of two or more such compounds. Examples of other useful compounds are acetone, dodecylmercaptan, methanol, methylacetate, butylacetate, ethylpropionate, cyclohexanone, methylenechloride, and the like. Also useful are various isoparaffins, such as alkanes of four to 18 carbon atoms containing at least one tertiary carbon atom for every three–six non-tertiary carbon atoms (e.g., isobutane, isopentane, isohexane, 2,6-dimethylheptane and the like). The various chain transfer agents differ as to their efficiency in performing the chain transfer function in a given polymerization system. Enough of the transfer agent is added in Step B so that the copolymer product will have the desired inherent viscosity and the desired polymer chain nonionic end-group concentration. When using a relatively efficient transfer agent, the desired polymer properties can often be obtained by adding during each time cycle about 1 mole of transfer agent for each mole of initiator. When using a relatively inefficient transfer agent, about 6 moles or more of transfer agent for each mole of initiator may be needed to obtain similar polymer properties.

The polymer chain non-ionic and ionic end-group concentration values can be calculated from the molecular weights of the polymers produced during each period of the polymerization cycle. The calculation is made on the basis that the inorganic free-radical initiator produces a polymer with 100 percent ionic end grous, and on the basis that the addition of a chain transfer agent (with an incremental amount of initiator to maintain substantially constant polymerization rate) to an otherwise identical system does not substantially change the number of ionic end groups per gram of polymer. If $M_1$ represents the number average molecular weight of the 100 percent ionic end polymer (produced without chain transfer agent), the polymer produced throughout the cyclic operation contains $2/M_1$ moles of ionic end groups per gram. If $M_2$ represents the number average molecular weight of the polymer containing the same amount of ionic ends and also nonionic ends (produced with free-radical initiator and transfer agent), then the polymer contains $2/M_2 - 2/M_1$ moles of non-ionic ends per gram. With cyclic feed of transfer agent, such that in each cycle polymer with the molecular weight $M_1$ is produced during a period $t_1$ with low feed rate of transfer agent and polymer with molecular weight $M_2$ is produced during period $t_2$ with high feed rate of transfer agent, the blended polymer has an ionic end group concentration of $2/M_1$ moles per gram and a non-ionic end group concentration of $[t_2/(t_1+t_2)]$ $(2/M_2-2/M_1)$ moles per gram. The fraction of non-ionic end groups is $$t_2(2/M_2-2/M_1)/t_1\,2/M_1+t_2\,2/M_2 = 1- M_2/M_1/1+t_1\,M_2/t_2M_1$$

and the percent non-ionic ends is 100 times the resulting fraction.

Analyses of the polymer for sulfur content (from free-radical initiator), by potentiometric titration and for adsorption of a dye on the polar groups (colorimetric) have all given results which are consistent with the calculated values for non-ionic end group concentration for polymers produced under known conditions. Analytical determinations and comparisons are based on 100 percent ionic free-radical initiator polymerization.

The proportion of materials fed to the reactor in Steps A and B (e.g., as illustrated in the examples that follow) is preferably such that the blended copolymer obtained in Step D has an inherent viscosity of about 0.4–1.5. The inherent viscosity values given herein are measured at 30°C. at a polymer concentration of 0.1 percent by weight in a solvent composed of 86.1 percent by weight tetrahydrofuran and 13.9 percent by weight dimethylformamide. It is known in the art that a high inherent viscosity indicates a high molecular weight.

The proportion of materials fed to the reactor is also preferably such that about 40–95 mol percent of the copolymer chain end-groups are non-ionic end-groups derived from the transfer agent. The amount of transfer agent fed to the reactor can be raised or lowered according to the non-ionic end-group content desired in the blended copolymer.

In carrying out the emulsion polymerization reaction of Step C, the reaction mixture is preferably heated at about 80°–130°C. under a pressure of about 500–1500 psig. It is also preferred that the residence time in the reaction zone is about 7–20 minutes, the low rate of feed in Step B is about 0–1 part of transfer agent per thousand of Step A monomers fed during the same period, the low rate period is about 3–30 times the residence time, the increased rate period is about 0.5–8 times the low rate period, and the product obtained in Step D comprises an intimate blend of low molecular weight polymer and high molecular weight polymer. It is especially preferred in some applications that the residence time in the reaction zone is about 8–15 minutes, the low rate period is about 4–8 times the residence time, and the increased rate period is about 2–6 times the low rate period. These conditions are preferred, for example, when a product is desired whose H/L value is about 2–3 (as illustrated in Example 1 below). As indicated above, H/L means the inherent viscosity of the high molecular weight component divided by the inherent viscosity of the low molecular weight component. In certain other applications, for example, when a product is needed whose H/L value is about 5–15 (as illustrated in Example 5 below), it is preferred that the residence time again is about 8–15 minutes, the low rate period is about 15–30 times the residence time, and the increased rate period is about 0.5–2 times the low rate period.

In some preferred embodiments of the process, the mixing of Step D is done by continuously passing the copolymer through a mixing zone wherein the residence time at least equals one of the Step B time cycles. The copolymer can be mixed as a latex, and preferably the mixing zone residence time equals about 1–6 Step B time cycles. Also, the water can be removed from the latex that leaves the reaction zone and the copolymer can be mixed in the form of a dry material. Or the copolymer can be mixed as a latex during part of Step D; then the water is removed and the copolymer is mixed as a dry material during the rest of Step D.

When Step D comprises mixing the copolymer in the form of a latex, it is preferred to add an emulsion stabilizer such as a surfactant and/or an alkaline compound to improve the stability of the latex while it is being mixed. The emulsion stabilizer can be added to the composition prior to Step D (e.g. during Step A) or during the early part of Step D. For example, in a typical use of the process an alkaline compound is added in an amount such that the pH of the latex is increased to about 3.5–5.0. A pH above 5 can also be used, but this may lead to a discolored copolymer. Materials which can be added to improve latex stability include $NaOH$, $KOH$, $LiOH$, $NH_4OH$, $Na_3PO_4$, $Na_2HPO_4$, $NaH_2PO_4$, $NaF$, $KF$, surfactants (preferably those containing partially or fully fluorinated alkyl groups such as ammonium perfluorooctanoate), and the like. An emulsion stabilizer is selected which will not undergo any harmful reaction with other ingredients of the composition.

One or more other additives such as those known to be useful in vinylidene fluoride copolymer compositions can also be added to the composition just before, during, or after Step D. Among the useful additives are divalent metal oxides and hydroxides, cross-linking agents, vulcanization accelerators, pigments, fillers, and pore-forming agents.

The copolymer can be isolated from the latex by known methods. For example, one can use the method described in U.S. Pat. No. 3,536,683 issued to Bailor and Copper (the disclosure of which is incorporated herein by reference). Thus, by aging the latex, adding an electrolyte, centrifuging, masticating into a crumb, washing, centrifuging and drying, one obtains a dry crumb form of polymer.

The process of this invention has beneficial utility for the manufacture of vinylidene fluoride copolymers. Such polymers are obtainable by this process which not only have utility in the manufacture of cured elastomer articles having good compression set properties but also have a broad molecular weight distribution and desirable processing characteristics including good flow properties and good cohesive strength. Moreover, this process is useful for the manufacture of such polymers in substantially uniform quality on a continuous basis at reasonable cost; and the polymers are easily produced in grades suitable for compounding and curing by known methods to yield highly useful cured elastomer articles for applications such as films, gaskets, O-rings, and the like which are very resistent to damage by corrosive chemicals and high temperatures.

The following examples illustrate the invention; all amounts are by weight unless otherwise indicated.

Example 1

A copolymer of vinylidene fluoride and hexafluoropropylene having desirable processing characteristics and having a broad molecular weight distribution that is substantially constant for the entire production run is prepared in a continuous process composed of the following operations: (1) continuously feeding gaseous monomers to a one liter pressure vessel reactor (polymerization reaction zone) through a two-stage piston compressor, while operating the stirrer of the reactor for thorough mixing of the reactor contents, and while the contents of the reactor are heated at a temperature of 107°C. under a pressure of 970 psig so that the reaction mixture formed in operations 2 and 3 will undergo an emulsion polymerization reaction as it passes through the reactor, the nominal reactor residence time being about one-sixth hour or ten minutes based on the 1:6 ratio of the one liter reactor to the water feed rate of 6 liters per hour, the monomers being vinylidene fluoride (feed rate of 755 grams per hour) and hexafluoropropylene (feed rate of 595 grams per hour); (2) during operation 1 for a period of 1 hour, feeding initiator solution to the reactor through a metering pump at the rate of 6 liters of solution per hour, the initiator solution being an aqueous solution of ammonium persulfate having a persulfate initiator concentration such that the initiator is fed at the rate of 4.2 grams per hour; (3) during operation 1 for a period of 4 hours following operation 2, feeding an aqueous solution of initiator and chain transfer agent to the reactor through a metering pump at the rate of 6 liters of solution per hour, the solution containing ammonium persulfate as initiator and diethylmalonate as chain transfer agent in an amount such that the initiator is fed at the rate of 5.2 grams per hour and the transfer agent is fed at the rate of 10.0 grams per hour; (4) repeating the above operations until operations 2 and 3 have been performed 10 times, thereby giving a production run of 50 hours (10-5 hour cycles); (5) continuously removing from the reactor the resulting copolymer latex which is continuously formed during operations 1-4, the latex being passed through a back-pressure regulating valve set to maintain the desired reactor pressure of 970 psig; (6) continuously mixing the resulting latex by passing it through a mixing vessel, the residence time of the latex in the mixing zone being 10 hours (2 times the 5 hour time cycle of operations 2 and 3). A small amount of a suitable emulsion stabilizer can be added at the beginning of operation 6 if desired, but this is not essential.

It will be noted that operations 2 and 3 make up a 5 hour time cycle (which is 30 times the 10 minute residence time) during which the transfer agent has a 0 rate of feed for a one-hour period (when high molecular weight copolymer is formed) and a sharply increased rate of feed of 10 grams per hour for the next period of 4 hours (when copolymer of lower molecular weight is formed). Also, the 1 hour low rate period is 6 times the 10 minute residence time, and the 4 hour increased rate period is 4 times the low rate period. The polymer leaving the reactor at the end of operation 2 has an inherent viscosity of 1.57. The polymerization rate during operation 2 is 1300 grams per hour, and the resulting latex has a polymer content of about 18 percent. The polymer leaving the reactor at the end of operation 3 has an inherent viscosity of 0.68. The polymerization rate during operation 3 is 1130 grams per hour. The H/L value (1.57/0.68) of the polymer blend is about 2.3.

The copolymer of the latex leaving the mixer has a molecular weight distribution that is broad and substantially constant for the entire 10 cycle 50-hour production run. The copolymer is composed of an intimate blend of high molecular weight polymer and polymer of considerably lower molecular weight as indicated by the inherent viscosity values mentioned above. About 20 percent of the polymer blend is composed of the high molecular weight polymer. The copolymer, when isolated from the blended latex, has an inherent viscosity of 0.83, a Mooney Viscosity (ML-10 at 100°C.) of 62, a vinylidene fluoride:hexafluoropropylene ratio of about 60:40, and is estimated to have a polymer chain non-ionic end-group percentage derived from the transfer agent of about 60 mol percent, calculated as above using $M_2/M_1 = (0.68/1.57)^{1.2}$.

The polymer prepared in Example 1 can be isolated from the latex by methods known in the art. For example, the polymer can be isolated as dried crumb in the manner described in the example of U.S. Pat. No. 3,536,683. The polymer is very useful in the manufacture of O-rings and other cured elastomer articles having desirable compression set properties; it has good cure behavior and vulcanizate properties. The cohesive strength of the polymer is high enough for good milling and acceptance of fillers. The polymer shows surprisingly little tendency to split and stick to the mill rolls both before and after addition of conventional fillers. The flow properties of the polymer are such that curable compositions are easily prepared from it which can be extruded and molded rapidly and efficiently.

When a process outside the present invention is used as follows in an attempt to prepare a blended polymer similar to that prepared in Example 1, the results are definitely less satisfactory than the results of Example 1. The blended polymer is prepared by (a) making dried crumb of a high molecular weight polymer (inherent viscosity 1.57) by using operations 1, 2, and 5 of Example 1 and converting the latex flowing from the reactor to dried polymer crumb in the manner described in the example of U.S. Pat. No. 3,536,683; (b) in another manufacturing apparatus of the same type, making dried crumb of a low molecular weight polymer (inherent viscosity 0.68) by using operations 1, 3, and 5 of Example 1 and converting the latex to crumb by the method used in Step (a); and (c) blending 20 parts of the product of Step (a) with 80 parts of the product of Step (b) on a rubber mill until the molecular weight distribution of the blended polymer is uniform.

The process cost per pound of product is much higher than when the Example 1 process is used because of the extra labor, time, and equipment needed. Also, over a period of time under ordinary manufacturing conditions, the product tends to be inferior to the Example 1 product; this is believed to be due to such factors as reduction in the molecular weight of the Step (a) product during Step (c) and the additional and difficult-to-control processing variables and likelihood of contamination introduced by the separate manufacture of the two polymer components and by the blending procedure.

Example 2

Results similar to those obtained in Example 1 are obtained by repeating that example except in operation 6 the latex which continuously flows from the reactor is passed into a batch-type mixer which will hold the amount of latex produced in 10 hours (two full time cycles), and the 10 hour batch of latex is mixed until the molecular weight distribution of the copolymer therein is uniform. When the first mixer is full, the latex flowing from the reactor is passed into another mixer for the next 10 hours and mixed as in Step (a). And this procedure is repeated for whatever number of 10 hour batches it is desired to produce in operations 1–4.

Example 3

Results similar to those obtained in Example 1 are obtained by repeating that example except in operation 6 the latex is first passed through a mixer wherein the residence time is 3 hours. The latex flowing from the mixer is converted to dried polymer crumb in a known manner, for example as described in the example of U.S. Pat. No. 3,536,683. Then a mixer which will hold the amount of dried crumb produced in ten hours is filled with the dried crumb and the polymer is mixed until its molecular weight distribution is uniform.

Example 4

A blended polymer similar to that prepared in Example 3 is produced by repeating Example 3 except: (a) in operation 1, a reactor capable of holding ten gallons of reaction mixture is used; the pressure in the reactor is 900 psig; the nominal reactor residence time is 11.3 minutes; the monomer feed rate is 24 kg. per hour of fresh vinylidene fluoride, 16 kg. per hour of fresh hexafluoropropylene and 5 kg. per hour of a 25:75 blend of vinylidene fluoride and hexafluoropropylene (unreacted monomer from the latex mixer of operation 6); (b) in operation 2, the initiator solution feed rate is 200 kg. per hour of an aqueous solution which provides 125 grams per hour of ammonium persulfate and 15 grams per hour of sodium sulfite; (c) in operation 3, 200 kg. per hour of an aqueous solution is used which provides 195 grams per hour of ammonium persulfate and 370 grams per hour of diethylmalonate; (d) in operation 5, the valve maintains a reactor pressure of 900 psig; and (e) in operation 6, a 440-gallon latex mixing vessel containing 300 gallons of latex is used; the mixer residence time is 5 hours; the pressure in the latex mixer is 30 psig (atmospheric pressure is used in Examples 1–3); the unreacted monomers are vaporized and passed to the reactor as indicated in (a) above; and after the latex is converted to dried crumb, a mixer which will hold the amount of dried crumb produced in 25 hours is filled and used to complete the mixing.

Example 5

A blended polymer is prepared in this Example which has a molecular weight distribution considerably broader than that of the Example 1 product. The process described in Example 1 is repeated except:

(a) In operation 1, the piston compressor is replaced with a diaphragm compressor; the reactor temperature is 110°C.; the reactor pressure is 930 psig; the nominal reactor residence time is 12 minutes; and the monomers (and feed rates) are: vinylidene fluoride (670 g./hr.), hexafluoropropylene (570 g./hr.) and tetrafluoroethylene (325 g./hr.).

(b) In operation 2, an aqueous initiator solution is fed for a period of 3.5 hours at a feed rate of 4.5 liters per hour so as to provide 1.7 g./hr. of ammonium persulfate and 0.65 g./hr. of sodium hydroxide; and at the same time an aqueous reducing agent solution is fed through another metering pump at a feed rate of 0.5 liters per hour so as to provide 1.0 g./hr. of sodium sulfite; it will be noted that the "low rate period" of operation 2 is about 17.5 times the residence time (210 min./12 min.).

(c) In operation 3, an aqueous solution is fed for a period of 2.5 hours at a feed rate of 5 liters per hour, the solution composition being sufficient to provide 11.6 g./hr. of ammonium persulfate, 3.3 g./hr. of sodium hydroxide, and 36 g./hr. of diethylmalonate; it will be noted that the "increased rate period" of operation 3 is about 0.7 times the low rate period (2.5 hrs./3.5 hrs.).

(d) In operation 5, the valve maintains a reactor pressure of 930 psig.

The polymer leaving the reactor at the end of operation 2 has an inherent viscosity of 2.35. The polymerization rate during operation 2 is about 1300 g./hr., and the resulting latex has a polymer content of about 21 percent. The polymer leaving the reactor at the end of operation 3 has an inherent viscosity of 0.32. The polymerization rate during operation 3 is about the same as in operation 2.

The H/L value (2.35/0.32) of the polymer blend prepared in Example 5 is about 7.3, as compared with the 2.3 value obtained in Example 1. Thus, the Example 5 product has a much broader molecular weight distribution than the Example 1 product. The blended and isolated polymer has an inherent viscosity of 1.27, a Mooney Viscosity (ML-10 at 100°C.) of 70, a vinylidene fluoride:hexafluoropropylene:tetrafluoroethylene ratio of about 48:28:24, and excellent mill behavior. Curable compositions are easily prepared by known methods from the polymer which can be extruded and molded with ease and efficiency into cured elastomer articles having very useful properties.

I claim:

1. A continuous process for the manufacture of a vinylidene fluoride copolymer having a broad molecular weight distribution that is substantially constant for a particular production run which comprises A. continuously feeding to a polymerization reaction zone vinylidene fluoride, at least one other fluorinated ethylenically unsaturated monomer containing at least as many fluorine atoms as carbon atoms, water, and an inorganic free-radical initiator, in proportions suitable for the free-radical emulsion polymerization of the monomers, B. during a plurality of substantially equal time cycles, feeding a chain transfer agent to said reaction zone at a rate that varies widely within a given time cycle according to a predetermined schedule of alternately using for 1 period a rate of feed that is very low or equal to zero and using a sharply increased rate of feed for the next period, each of said periods being at least 3 times the average residence time of the resulting reaction mixture in the reaction zone, C. causing the resulting reaction mixture to undergo a free-radical emulsion polymerization reaction as it passes through the reaction zone whereby a latex of said copolymer is formed continuously, and D. continuously removing the resulting copolymer from the reaction zone and mixing it, until its molecular weight distribution is substantially uniform, in a mixing zone holding at least the amount of copolymer produced in one of the Step B time cycles;

the proportion of materials fed in Steps A and B being such that the copolymer obtained in Step D has an inherent viscosity of about 0.4–1.5; and said process also being characterized in that the residence time in the reaction zone is about 7–20 minutes, the low rate of feed in Step B is about 0–1 part of transfer agent per thousand of Step A monomers fed during the same period, the low rate period is about 3–30 times the residence time, the increased rate period is about 0.5–8 times the low rate period, and the product obtained in Step D comprises an intimate blend of low molecular weight polymer and high molecular weight polymer.

2. A process according to claim 1 wherein the vinylidene fluoride and the other monomer component used in Step A have a weight ratio of about 30:70 to 70:30, and in Step B the rate of feed of transfer agent for each of said periods is substantially the same in each time cycle of the production run.

3. A process according to claim 2 wherein the reaction mixture is heated during Step C at about 80–130°C. under a pressure of about 500–1500 psig.

4. A process according to claim 2 wherein the other monomer is hexafluoropropylene.

5. A process according to claim 1 wherein the monomers used in Step A are composed of about 25–70 percent vinylidene fluoride, 19–60 percent hexafluoropropylene, and 3–35 percent tetrafluoroethylene based on the total weight of said monomers.

6. A process according to claim 2 wherein the initiator of Step A is a compound selected from the group: ammonium persulfate, potassium persulfate, and sodium persulfate.

7. A process according to claim 2 wherein the transfer agent of Step B is a compound selected from the group: diethylmalonate, diethylsuccinate, ethylacetate, methylene bromide, carbontetrachloride, ethanol, and propanol.

8. A process according to claim 1 wherein the proportion of materials is such that about 40–95 mol percent of the copolymer chain end-groups are non-ionic end-groups derived from the transfer agent.

9. A process according to claim 1 wherein the residence time in the reaction zone is about 8–15 minutes, the low rate period is about 5–15 times the residence time, and the increased rate period is about 2–6 times the low rate period.

10. A process according to claim 1 wherein the residence time in the reaction zone is about 8–15 minutes, the low rate period is about 15–30 times the residence time, and the increased rate period is about 0.5–2 times the low rate period.

11. A process according to claim 2 wherein the mixing of Step D is done by continuously passing the copolymer through a mixing zone wherein the residence time at least equals one of the Step B time cycles.

12. A process according to claim 11 wherein the copolymer is mixed in the form of a latex, and the mixing zone residence time equals about 1–6 Step B time cycles.

13. A process according to claim 11 wherein the water is removed from the latex that leaves the reaction zone, and the copolymer is mixed in the form of a dry material.

14. A process according to claim 11 wherein the copolymer is mixed as a latex during part of Step D; then the water is removed and the copolymer is mixed as a dry material during the rest of Step D.

* * * * *